(12) United States Patent
Mengle

(10) Patent No.: US 6,761,063 B2
(45) Date of Patent: Jul. 13, 2004

(54) TRUE POSITION SENSOR FOR DIAPHRAGM VALVES

(75) Inventor: Tobi Mengle, 931 Lincoln Rd., Birdsboro, PA (US) 19508

(73) Assignee: Tobi Mengle, Birdsboro, PA (US)

(*) Notice: Subject to any disclaimer, the term of this patent is extended or adjusted under 35 U.S.C. 154(b) by 0 days.

(21) Appl. No.: 10/185,635

(22) Filed: Jun. 28, 2002

(65) Prior Publication Data

US 2003/0001590 A1 Jan. 2, 2003

Related U.S. Application Data

(60) Provisional application No. 60/302,026, filed on Jul. 2, 2001.

(51) Int. Cl.[7] ............................................. G01M 19/00
(52) U.S. Cl. ............................. 73/168; 73/715; 73/718; 73/724
(58) Field of Search .......................... 73/168, 715, 718, 73/724

(56) References Cited

U.S. PATENT DOCUMENTS 3,813,008 A * 5/1974 Olson ........................ 222/641
5,216,273 A * 6/1993 Doering et al. ............. 257/419
6,182,941 B1 * 2/2001 Scheurenbrand et al. ..................... 251/129.04

\* cited by examiner

*Primary Examiner*—Hezron Williams
*Assistant Examiner*—André K. Jackson
(74) *Attorney, Agent, or Firm*—Wendy W. Koba

(57) ABSTRACT

An arrangement for measuring the true position of a diaphragm within a diaphragm valve assembly utilizes a thin conductive element disposed in the valve between the diaphragm membrane and the actuator. The conductive element and the valve body are then used as the plates of a parallel plate capacitor, where the measured capacitance will vary as a function of the position of the diaphragm mambrane, having a first value when the diaphragm is in the "open" position and a second value when the diaphragm is in the "closed" position. Position values between the "open" and "closed" positions can also be determined, as well as the presence of different fluids within the valve body when the valve is in the "open" position.

8 Claims, 2 Drawing Sheets

TRUE POSITION SENSOR FOR DIAPHRAGM VALVES

CROSS-REFERENCE TO RELATED APPLICATION

This application claims the benefit of Provisional Application No. 60/302,026, filed Jul. 2, 2001.

TECHNICAL FIELD

The present invention relates to a true position sensor for diaphragm valves and, more particularly, to the inclusion of a conductive member in parallel with the diaphragm to determine the true position of the diaphragm within the valve assembly.

BACKGROUND OF THE INVENTION

Diaphragm valves are used extensively within the process industry and particularly within the biopharmaceutical process industry to control fluid flow for high purity water, steam and other process fluids. The diaphragm valve is the valve of choice since the design ensures minimal areas for trapped fluid, is freely drainable, and is easily cleaned. The typical design comprises a stainless steel valve body with two wells for the fluid inlet and outlet, similar to a double bowl kitchen sink. The diaphragm is typically a flat elastomer plate that seals against the top edge of the wall between the two wells when the valve is closed, and is lifted away from the top edge of the wall when the valve is open, so as to allow fluid to flow between the wells. An actuator, typically a compressed air operated piston, moves the diaphragm away from the valve body to open the valve, and a spring mechanism forces the diaphragm back against the valve body when the opening force is removed. The diaphragm is typically connected to the actuator with a threaded stud that screws into one end of a rod that is moved by the air-operated piston. The other end of the actuator rod protrudes out the top of the actuator when the valve is open, and retracts into the actuator when the valve is closed, to be used as an external visual indication of the state of the valve. A limit switch assembly is often attached to the top of the actuator and uses a cam rod that threads into the top of the actuator rod and moves with the actuator to activate switches that provide control systems with an electrical indication of the valve position.

With the critical importance of consistent control over, for example, pharmaceutical manufacturing, many of the diaphragm valves used are computer controlled and monitored. The typical method of monitoring the position of a diaphragm valve is using the limit switch assembly described above. However, a proven problem with the limit switch assemblies is that they indicate the position of the actuator rod, and not necessarily the true position of the diaphragm. Since the diaphragm is connected to the actuator rod by a threaded stud or other suitable mechanical attachment, the diaphragm can be mis-assembled or become separated from the actuator rod with no visible indication of any problem. In this case, the computer control system can command the valve to open and receive feedback from the limit switch that the valve is open, when in fact the diaphragm is still in the closed position.

Another problem with prior art limit switch indicators is that they must periodically be adjusted to correctly indicate the actuator position. This is both an extra step during the manufacturing process, as well as a continuing maintenance issue. Moreover, state-of-the-art limit switch assemblies have no way of indicating the presences of fluid within the valve body.

Thus, a variety of needs remain in the art for a diaphragm valve arrangement that can more accurately indicate the proper position and status of the diaphragm within the valve assembly.

SUMMARY OF THE INVENTION

The need remaining in the prior art is addressed by the present invention, which relates to a true position sensor for diaphragm valves and, more particularly, to the inclusion of a conductive member in parallel with the diaphragm, where a sensing circuit is coupled to the conductive member and utilizes changes in capacitive readings associated with the conductive member to determine the true position of the diaphragm within the valve assembly.

In accordance with the present invention, a thin conductive plate, electrically insulated from its surroundings and with dimensions similar to the diaphragm itself, is placed parallel to the diaphragm and disposed between the diaphragm and the actuator. The thin conductive plate and the actuator body are connected to a circuit that senses both the capacitance and resistance between the plate and the valve body, and uses the change in these electrical quantities as the valve is opened and closed to determine the true position of the valve.

An advantage of the true position sensor of the present invention is that if a fluid is in contact with the diaphragm when the diaphragm is in the open position, the capacitance and resistance will change relative to the open position with no fluid, thus providing an indication that fluid is present in the valve, as well as the type of fluid that is present.

Other and further advantages and embodiments of the present invention will become obvious during the course of the following discussion and by reference to the accompanying drawings.

BRIEF DESCRIPTION OF THE DRAWINGS

Referring now to the drawings, wherein like numerals represent like parts in several views.

DETAILED DESCRIPTION

Figure 1:
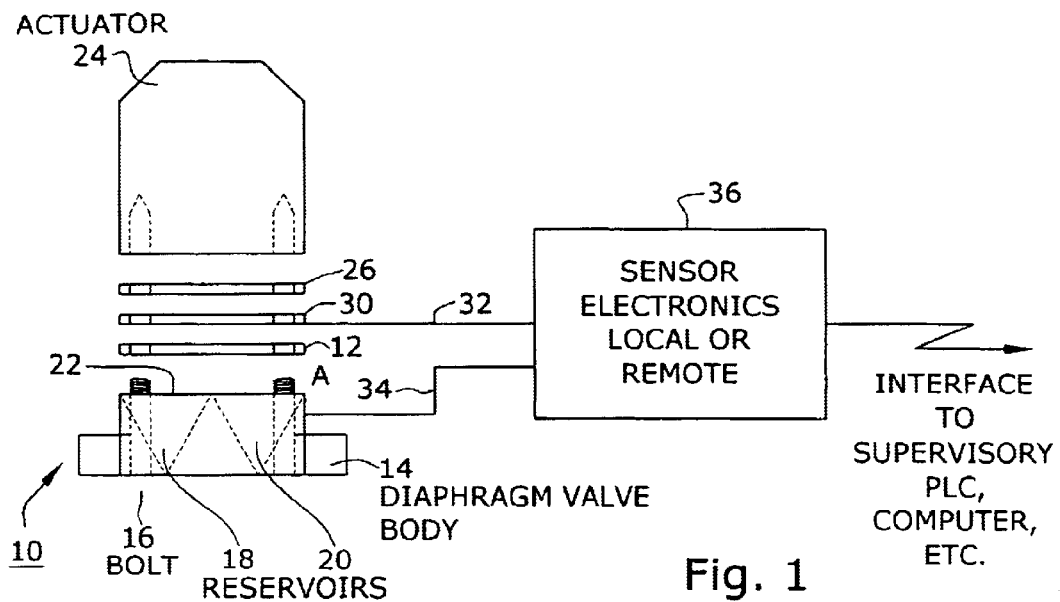
FIG. 1 is an exploded, simplified view of an exemplary diaphragm valve incorporating a true position sensor formed in accordance with the present invention.

FIG. 1 illustrates, in a simplified and exploded view, an exemplary diaphragm valve 10 including a true position sensor formed in accordance with the present invention. Diaphragm valve 10 includes a conventional diaphragm membrane 12, which comprises a flexible lightweight material, such as a Teflon® elastomer. Diaphragm membrane 12 is connected to a diaphragm body 14 using a suitable attachment arrangement, such as a plurality of assembly bolts 16. Shown in phantom within diaphragm body 14 is a pair of reservoirs 18 and 20, where the position of diaphragm membrane 12 with respect to top surface 22 of reservoirs 18 and 20 will either prevent the flow of liquid from one reservoir to another (the "closed position"), or permit the flow of liquid (the "open" position). A diaphragm actuator 24 is used to control the position of diaphragm membrane 12 and, as shown, can be attached to both membrane 12 and body 14 using the same assembly bolts 16. A section of diaphragm backing material 26 is used to prevent contact between membrane 12 and actuator 24.

In accordance with the present invention, a true position sensor is incorporated into the diaphragm valve by using a thin conductive plate 30 disposed as shown in FIG. 1 between diaphragm membrane 12 and backing material 26. Conductive plate 30 is formed to comprise essentially the same shape and dimensions as diaphragm membrane 12 and will thus easily nest against membrane 12 when all of the component pieces are assembled. A first electronic lead 32 is coupled, as shown, to conductive plate 30 and a second lead 34 is similarly coupled to valve body 14. As will be discussed in detail below in associated with FIGS. 2 and 3, a sensor circuit 36 is coupled to leads 32 and 34 and is used to sense the resistance and capacitance between thin conductive plate 30 and valve body 14. Since with the inclusion of the conductive plate the diaphragm valve is now a sandwich of materials (membrane 12, plate 30, body 14), a different capacitance will be measured depending on the true position of member 12. That is, when the valve is in the closed position, the layers are in close proximity and have a first measured capacitance. When actuator 24 is then used to move membrane 12 into the open position, a cavity will be formed between plate 30 and membrane 12, where the air, vacuum or fluid within the cavity will become a second dielectric material and thus change the measured capacitance. Therefore, in accordance with the present invention, the capacitance measured by sensor circuit 36 can be used to accurately determine the true position of diaphragm membrane 12.

An additional benefit of the use of conductive plate 30 is that it can be used to detect the presence of fluid within the valve body when the valve is in the open position. Since this measured value will be different from either the known "open" or "closed" capacitance values, the measured value can be used as an indication that fluid is within the valve body. The dielectric constant and associated capacitance of each expected fluid can be characterized and used to provide an indication of the fluid present within the valve.

In general, the capacitance of a parallel plate capacitor is given by the following relation:

$$C = K\epsilon_0 A/L,$$

where C is the capacitance measured in farads (F), K is defined as the dielectric constant of the material disposed between the parallel plates (in this case, between conductive plate 30 and valve body 14), $\epsilon_0$ is a known proportionality constant (equal to $8.85 \times 10^{-12}$), A is the parallel plate area measured in square meters, and L is the distance, between the plates, as measured in meters.

In one exemplary embodiment of the present invention, a parallel plate area of 0.045 m×0.045 m was used (thus, A=0.002 m$^2$). Diaphragm membrane 12 was determined to have a thickness of 0.001651 m, with a dielectric constant (for Teflon, in this case) of K=2.1. In the closed state of the diaphragm valve, there is no air present between the parallel plates, only membrane 12. Therefore, the above values can be inserted in the equation to determine a "closed" valve capacitance value as follows:

$$C_{closed} = (2.1)(8.85 \times 10^{-12})(0.002)/(0.001651) = 22.5 \times 10^{-12} \text{ F},$$

or 22.5 picofarads.

In the "open" state, membrane 12 moves away from surface 22 of valve body 20, thus adding a region of air to the gap between the capacitor plates, where this air-related capacitance will add in series with the membrane-related capacitance. Since the dielectric constant of air is approximately equal to 1.0, the capacitance attributed to the presence of air in the valve assembly is determined from the following:

$$C_{air} = (1.0)(8.85 \times 10^{-12})(0.002)/(0.00381) = 4.65 \times 10^{-12} \text{ F},$$

The increase in "L" to a value of 0.00381 m is attributed to the movement of membrane 12 to the open position. As is well-known in the art, the equivalent capacitance of capacitors in series is the sum of the reciprocals of the individual capacitors, or:

$$1/C = 1/C_1 + 1/C_2.$$

Therefore, the "open" state capacitance for the true position sensor of the present invention can be defined as follows:

$$C_{open} = 1/(1/C_{air} + 1/C_{closed}),$$

where using the particular values defined above, $$C_{open} = 1/[1/(22.5 \times 10^{-12}) + 1/(4.65 \times 10^{-12})] = 3.85 \times 10^{-12} \text{ F}.$$

Therefore, it is shown that the total capacitance of the diaphragm valve reduces by approximately $18.65 \times 10^{-12}$ F when the valve moves from its closed to its open position. As discussed below, sensor circuit 36 converts this change in capacitance to a change in frequency, which is counted and compared in an associated microprocessor.

Figure 2:
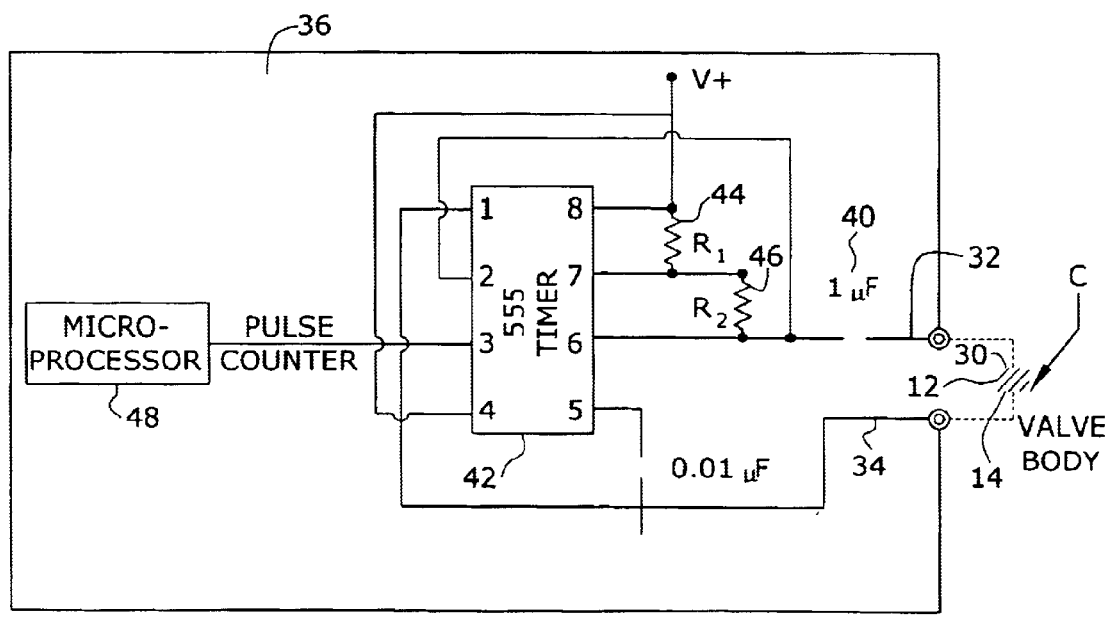
FIG. 2 illustrates an exemplary sensing circuit that may be used for sensing the capacitance and resistance changes associated with the conductive plate of the true position sensor.
Figure 3:
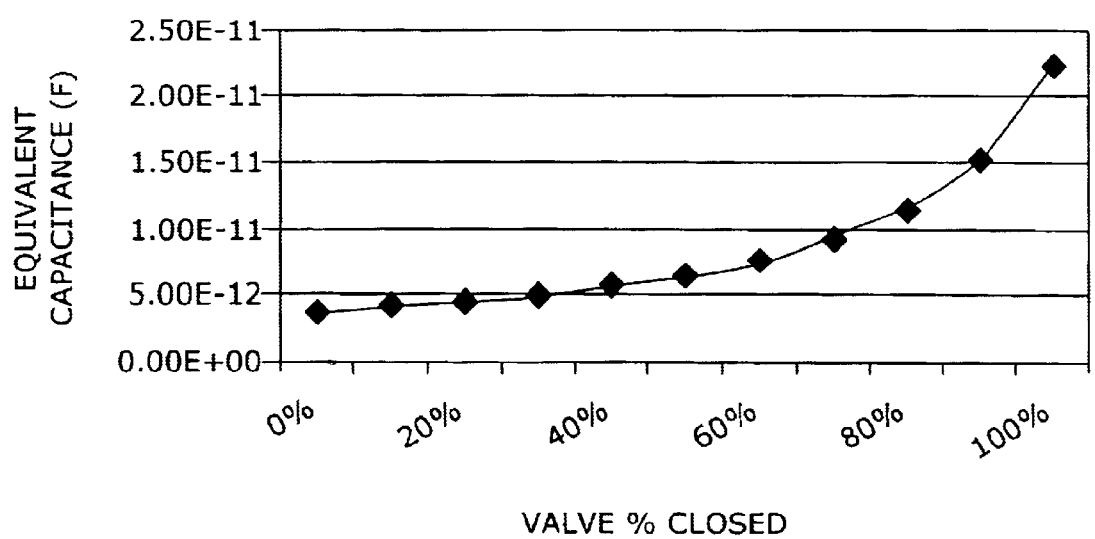
FIG. 3 is a graph illustrating the relationship between measured capacitance and the true position of a diaphragm membrane within a diaphragm valve assembly.

FIG. 2 contains a diagram of an exemplary sensor circuit 36 that may be used to measure and record the capacitance values associated with using conductive plate 30 within the diaphragm valve assembly. For the purposes of discussion, the "sandwich" of conductive plate 30, membrane 12 and valve body 14 are illustrated as variable capacitor C in FIG. 2, where the variation in capacitance, as mentioned above and discussed in detail below, will be used to accurately determine the true position of diaphragm membrane 12 within valve assembly 10. As shown, first lead 32 is connected to a capacitor 40 within sensor 36 and second lead 34 is connected to ground. The output from first lead 32 passes through capacitor 40 and is applied as an input to a conventional timing circuit 42 (i.e. a conventional 555 timer). Timing circuit 42 is biased by a positive supply voltage V$^+$ and is also grounded. A resistor network comprising a first resistor 44 and second resistor 46 is used to provide the appropriate bias value, depending on the expected capacitance within the diaphragm valve. The measured capacitance between plate 30 and body 14 is passed through timing circuit 42 and converted to a pulse stream which is subsequently applied as an input to a microprocessor 48. Microprocessor 48 utilizes the pulse input in association with "known" values for the capacitance associated with the open and closed positions of membrane 12 to determine the current, true position of the membrane. FIG. 3 contains an exemplary plot illustrating the relationship between the measured capacitance and the "valve % closed" position of a diaphragm membrane 12. As seen by reference to this plot, the capacitive value increases as membrane 12 moves from the open to closed position.

It will be obvious to those skilled in the art that many modifications and variations may be made to the preferred embodiment described above without departing from the novel teachings of the present invention. All such modifications and variations are intended to be incorporated herein and within the scope of the present invention, as set forth in the following claims.

What is claimed is:

1. An arrangement for measuring the true position of a diaphragm membrane within a diaphragm valve, said diaphragm valve including a valve body having at least a pair of reservoirs controlled by said diaphragm membrane and actuator for moving said membrane between an open position and a closed position, the arrangement comprising:

a thin conductive member disposed between the diaphragm membrane and the actuator, said thin conductive member comprised of essentially the same dimensions as said diaphragm membrane; and a capacitive measuring arrangement connected between said thin conductive member and said valve body for measuring the capacitance from said valve body, through said diaphragm membrane and to said thin conductive member, the capacitance having a first value when the diaphragm membrane is in the closed position and in contact with said valve body and a second value when the diaphragm membrane is in the open position and separated from said valve body, the capacitive measuring arrangement comprising a first lead coupled to the thin conductive member, a second lead coupled to the valve body, a timing circuit coupled to the first and second leads for converting the measured capacitance into a frequency signal, and a microprocessor coupled to the timing circuit for translating the frequency signal into a signal indicative of the true position of the diaphragm membrane with respect to the valve body.

2. The arrangement as defined in claim 1 wherein the first capacitance value, associated with the closed position, is greater than the second capacitance value, associated with the open position.

3. The arrangement as defined in claim 1 wherein the capacitive measuring arrangement provides a signal when the measured capacitance exhibits a third value, indicative of the presence of fluid between the membrane and the valve body when the membrane is in the open position.

4. A method of determining the true position of a diaphragm membrane within a diaphragm valve assembly including a valve body having at least a pair of reservoirs controlled by said diaphragm membrane and an actuator for moving said membrane between an open position and a closed position, the method comprising the steps of:

inserting a thin conductive plate between the diaphragm membrane and the actuator such that said thin conductive plate is located on the opposite side of said membrane with respect to said valve body and moves in concert with the membrane; and measuring the capacitance between the thin conductive plate, the membrane and the valve body, wherein the capacitance will exhibit a first value when the valve is in the closed position and a second value when the valve is in the open position, the capacitance measured by coupling a first lead to the thin conductive member, coupling a second lead to the valve body, and coupling a timing circuit between the first lead and the second lead for converting the measured capacitance into a frequency signal, and using a microprocessor for translating the frequency signal into a signal indicative of the true position of the diaphragm membrane with respect to the valve body.

5. The method as defined in claim 4 wherein the first measured value is greater than the second measured value.

6. The method as defined in claim 4 wherein the method comprises the further step of:

generating a signal when the measured capacitance has a third value associated with the presence of other materials within the valve body when the valve is in the open position.

7. The method as defined in claim 6 wherein the other material comprises a liquid.

8. The method as defined in claim 4 wherein additional measured values between the first value and the second value can be used to provide an indication of any position of the diaphragm membrane within the valve body.

* * * * *